United States Patent

Konno et al.

[11] Patent Number: 5,827,046
[45] Date of Patent: Oct. 27, 1998

[54] TRANSVERSE FAN, METHOD OF MANUFACTURING THE SAME AND APPARATUS THEREFOR

[75] Inventors: Satoru Konno; Akira Nagamori; Hirohumi Horino; Tsutomu Hirose; Yoshio Ikeda; Yoichiro Kobayashi, all of Fuji, Japan

[73] Assignee: Kabushiki Kaisha Toshiba, Kawasaki, Japan

[21] Appl. No.: 644,122

[22] Filed: May 10, 1996

Related U.S. Application Data

[62] Division of Ser. No. 382,097, Jan. 31, 1995, abandoned.

[30] Foreign Application Priority Data

Aug. 9, 1994 [JP] Japan .................................. 6-187575

[51] Int. Cl.⁶ ...................................................... B63H 1/26
[52] U.S. Cl. ...................... 416/178; 416/187; 416/200 R
[58] Field of Search .................................. 416/178, 187, 416/200 R

[56] References Cited

U.S. PATENT DOCUMENTS

| | | | |
|---|---|---|---|
| 3,070,844 | 1/1963 | Warnken | 425/DIG. 5 |
| 3,572,424 | 3/1971 | Byrne | 425/441 |
| 3,921,272 | 11/1975 | Klonoski | 416/178 |
| 4,383,819 | 5/1983 | Letica | 425/DIG. 5 |
| 4,538,963 | 9/1985 | Sugio et al. | 416/203 |
| 4,975,041 | 12/1990 | Fries et al. | 425/441 |
| 5,114,657 | 5/1992 | Miyajima | 425/441 |
| 5,266,007 | 11/1993 | Bushnell et al. | 416/200 R |
| 5,269,655 | 12/1993 | Chang | 416/178 |
| 5,415,226 | 5/1995 | Koo | 416/187 |
| 5,431,556 | 7/1995 | Luther | 425/556 |
| 5,478,205 | 12/1995 | Chou et al. | 416/178 |

FOREIGN PATENT DOCUMENTS

| | | |
|---|---|---|
| 0 246 325 | 11/1987 | European Pat. Off. . |
| 2 246 191 | 4/1975 | France . |
| 0014009 | 2/1979 | Japan ..................................... 416/187 |
| 0122396 | 7/1983 | Japan ..................................... 416/178 |
| 59-19838 | 6/1984 | Japan . |
| 59-39196 | 10/1984 | Japan . |
| 0014498 | 1/1986 | Japan ..................................... 416/178 |
| 2061395 | 3/1990 | Japan ..................................... 416/178 |
| 3249400 | 11/1991 | Japan ..................................... 416/178 |
| 1001153 | 8/1965 | United Kingdom . |
| 1164303 | 9/1969 | United Kingdom . |
| 2205522 | 12/1988 | United Kingdom . |

OTHER PUBLICATIONS

UK Search Report—GB 9501864.4, Sep. 25, 1995 (2 sheets).

*Primary Examiner*—Edward K. Look
*Assistant Examiner*—Mark Sgantzos
*Attorney, Agent, or Firm*—Foley & Lardner

[57] ABSTRACT

A transverse fan includes a pair of end plates each having an annular shape, a plurality of blades annularly disposed between the end plates and a plurality of partition plates each having an annular shape and disposed at intermediate portions of the blades. Each of the partition plates has one side surface to which base ends of the blades are integrally secured to extend forward with a predetermined inclination and form a multi-blade impeller. A plurality of the multi-blade impeller are stacked axially so that each of the partition plates has another one side surface to which leading ends of the blades of adjacent multi-blade impeller are connected, and one of the end plate has one surface to which the leading ends of the blades of a leading end side one of the stacked multi-blade impellers are connected and another one of the end plates has one surface to which the base ends of the blades of a base end side one of the stacked multi-blade impellers is secured. The another one of the end plates is provided with a boss portion to which a rotation shaft for rotating the transverse fan is secured. Each of the multi-blade impellers is injection molded integrally in a mold and the multi-blade impeller is thereafter withdrawn from the mold while rotating the multi-blade impeller about a rotation axis thereof.

10 Claims, 13 Drawing Sheets

TRANSVERSE FAN, METHOD OF MANUFACTURING THE SAME AND APPARATUS THEREFOR

This application is a divisional of application Ser. No. 08/382.097, filed Jan. 31, 1995, now abandoned.

BACKGROUND OF THE INVENTION

The present invention relates to a transverse fan suitable for use as a room fan for air conditioners, a method of manufacturing the same and an apparatus therefor, and more particularly, relates to a transverse fan having a structure that a plurality of molded multi-blade impellers are sequentially stacked and secured in an axial direction thereof, to a method of manufacturing the same and to an apparatus therefor.

A common example of an air conditioner incorporating this type of transverse fan as a room fan is shown in FIG. 17. The air conditioner comprises a room unit 1 having a front surface 2a of a body casing 2 on which a suction grille 3 and a blow-out grille 4 are disposed vertically at the upper and lower portions of FIG. 17, the suction grille 3 and the blow-out grille 4 being allowed to communicate with each other through a ventilating passage 6 formed in a fan casing 6.

The ventilating passage 6 includes a transverse fan 8 serving as a room fan disposed downstream from an indoor heat exchanger 7. Thus, air in the room sucked into the body casing 2 through the suction grille 3 is subjected to heat exchange in the indoor heat exchanger 7, causing cold or hot air to be again sent to outside of the room through the blow-out grille 4 by the transverse fan 8 thereby to cool or warm the room.

The conventional transverse fan 8 of the described type comprises a plurality of elongated blades 8c between a pair of disc-like right and left end plates 8a and 8b, the elongated blades 8c being allowed to run parallel with respect to a fan axis O at predetermined pitches in the circumferential direction of the transverse fan 8 as shown in FIG. 18. At intermediate positions in the axial direction of the transverse fan 8, annular partition plates 8d are disposed at predetermined pitches in the axial direction.

The transverse fan 8 constitutes an air blower in association with the fan casing 5 and a nose 9 shown in FIG. 17, the air blower having a suction portion and a blow-out portion adjacent to gaps among the nose 9, the fan casing 5 and the transverse fan 8. These two gap portions are main sources of generating noise of the blower because an exceeding pressure change takes place due to inversion of the air flowing direction with respect to the elongated blades 8c of the transverse fan 8.

Noise is generated due to the pressure change such that noise produced due to the rotation of the fan and indicated by waveform N in FIG. 19A has a peak Pa at a frequency defined by the multiplication of the number of the elongated blades 8c of the transverse fan 8 and the rotational speed of the same and has also a peak Pb at a frequency that is two times the foregoing frequency. Since the waveform of the pressure change takes place rapidly and steeply, harmonic waves (harmonic Pb) having this waveform as the fundamental wave can easily be generated.

Note that FIG. 19A shows the result of analysis of the noise N of the blower generated when the transverse fan 8 having, for example, a diameter of 88 mm and an overall length of 593 mm and comprising 35 elongated blades 8c each running parallel to the fan axis O is rotated at a speed of 20 rotations/second.

Although the quantity of air supplied per rotation increases in inverse proportion to the size of the gaps among the transverse fan 8, the nose 9 and the fan casing 5, the pressure change becomes excessive in the gaps. Hence, the rotation noise N is enlarged and the harmonic waves are increased. The gaps having small sizes to a certain extent may enlarge the air flow quantity and thus lower the noise level if the same quantity of air is blown, thus improving the blowing performance. But excessive reduction in the sizes of the gaps correspondingly increases the rotation noise N, causing unpleasant noise. In the conventional structure, therefore, the gaps cannot be made too small.

In a blower using the conventional transverse fan 8 in which the longitudinal portion of each of the elongated blades 8c runs parallel to the fan axis 0, the nose 9 and fan casing 5, which form the blower in association with the transverse fan 8, are constructed to run parallel to the fan axis O. Therefore, each of the elongated blades 8c passes near each of the gaps between the elongated blade 8c and the nose 9 and between the elongated blade 8c and the fan casing 5. As a result, the overall lengthwise portion of the elongated blade 8c passes through each gap in a short time, thus causing pressure change to take place simultaneously in a space having the length of the elongated blade 8c. Therefore, the total sum of the pressure change by one elongated blade 8c is large and the waveform is distorted excessively, resulting in harmonic waves being easily generated (see FIG. 19A). The distortion of the waveform is changed considerably in accordance with the degree of parallelism of the nose 9, the fan casing 5 and the elongated blades 8c. Such considerable change easily changes the number and the degree of the harmonic waves. That is, a blower of the type comprising the transverse fan 8 which includes the elongated blades 8c disposed parallel with the fan axis O easily encounters occurrence of individual difference in the harmonic waves of the rotation noise N. The harmonic waves included in the noise produces unpleasant noise. If the size of the gap from the noise and that from the fan casing 5 is reduced for the purpose of enlarging the air quantity, the sound level of the rotation noise N is raised excessively. Therefore, the gap cannot be reduced satisfactorily and, thus, the air quantity cannot be increased as desired.

Accordingly, the transverse fans respectively disclosed in Japanese Utility Model Publication No. 59-39196, Japanese Utility Model Laid-Open No. 56-2092 and Japanese Utility Model Laid-Open No. 56-45196 have a structure in which blades not are disposed parallel with to the fan axis O to continuously generate the pressure changes and to prevent the rotation noise N.

In such prior art, a transverse fan 10 shown in FIG. 20 usually has a structure that a plurality of elongated blades 11 are allowed to penetrate a plurality of disc-like partition plates 12, the elongated blades 11 are secured to the plural partition plates 12 and the right and left end plates 13a and 13b, and torsional force is applied so that the elongated blades 11 are plastically deformed. As an alternative to this technique, a transverse fan 14 shown in FIG. 21 has a structure in which a plurality of elongated blades 15 are applied with external force so as to be twisted and, in this state, the elongated blades 15 are secured to a plurality of partition plates 16 and a pair of right and left end plates 17a and 17b.

A transverse fan disclosed in Japanese Utility Model Publication No. 59-19838 has a structure in which multi-blade impellers having such an arrangement as that in which a plurality of blades running parallel to the axis of the transverse fan are stood upward on either side of the partition plate and receiving grooves are formed on the other side by the same number as that of the blades used, and the leading portions of the blades of the impellers are inserted into the receiving grooves formed in the partition plate for another impeller so as to be connected with each other, thus assembling one transverse fan. The shape of the grooves is formed in such a manner that the leading portions of the blades are twisted in a predetermined direction when the blades are forcibly inserted into the grooves to establish the connection.

(1) However, the conventional transverse fans of the type having the blades that are applied with external force so as to be deformed involve excessively large residual stress being left in the material for the blade, thus causing a problem in that a desired dimension accuracy cannot easily be realized. As a result, the performance of the manufactured blower cannot easily be made uniform. In addition, the residual stress can be reduced by only annealing that is performed for a long time. In order to prevent stress from being left in the material for the blade, a method may be employed which has the step of forming the blade into a circular arc shape in the longitudinal direction. However, a cutting work required for this purpose involves waste of the material and increasing of the processes in number.

(2) The transverse fan disclosed in Japanese Utility Model Publication No. 59-39196 is assembled in a state where the twisted elongated blades are formed. Therefore, although the residual stress in the elongated blades can be reduced, the following problem (3) will arise:

(3) In general, an external impact applied to the transverse fan concentrate stress in a portion that establishes the connection between the blade and the partition plate. Therefore, the connection portion can easily be deformed or broken.

Therefore, in the case where the elongated blades can be inserted into the grooves or apertures formed to the partition plates, caulking or bonding working may be employed to surely connect the blades to the partition plates. However, either working suffers from poor strength and rigidity obtained in the connection portion, thus resulting in that the connection portion can be easily plastically deformed even by a relatively small external force. Hence, the angle made by the partition plates and the blades connected to one another will easily be changed.

What is worse, the shape of the manufactured blades with respect to the axis of the transverse fan, and in particular, the degree of non-parallelization, cannot be stabilized at the time of manufacturing thus, increasing manufacturing and errors, causing the blowing performance to be scattered exceedingly.

The conventional caulking method usually comprises a step of forming gaps except the caulking points to improve the working efficiency, causing axial-directional air flows to be introduced into the gaps for the caulking process because the air flows generated on the surfaces of the blades of the transverse fan collide with the partition plates, thus providing a problem of generating blowing noise.

(4) The transverse fan disclosed in Japanese Utility Model Publication No. 59-19838 has a structure in which the grooves for fixedly receiving the blades by welding are formed into a mortar-like shape so as to be twisted at the time of securing the blades by welding, thus enabling blades having different lengths to be manufactured. However, an external force is applied to twist the blades when the molded blades are assembled, resulting in a problem similar to (1).

SUMMARY OF THE INVENTION

An object of the present invention is to substantially eliminate defects or drawbacks encountered in the prior art described above and to provide a transverse fan with low noise and a high efficiency, enabling the shape of the blade and the length of the transverse fan to be changed easily, exhibiting adequate reliability and reducing the cost, also to provide a method and apparatus for manufacturing such transverse fan.

This and other objects can be achieved according to the present invention by providing, in one aspect, a transverse fan comprising:

a pair of end plates each having an annular shape;

a plurality of blades annularly disposed between said end plates; and a plurality of partition plates each having an annular shape and disposed at intermediate portions of said blades, each of said partition plates having one side surface to which base ends of said blades are integrally secured so as to extend forward with an inclination at a predetermined angle to form a multi-blade impeller, wherein a plurality of said multi-blade impeller are stacked axially so that each of said partition plates has another one side surface to which leading ends of the blades of adjacent multi-blade impeller are connected and wherein one of said end plate has one surface to which the leading ends of the blades of a leading end side one of the stacked multi-blade impellers are connected and another one of said end plates has one surface to which the base ends of the blades of a base end side one of the stacked multi-blade impellers is secured, said another one of the end plates being provided with a boss portion to which a rotation shaft for rotating the transverse fan is secured.

In a preferred embodiment, the blades of each of the multi-blade impellers are concentrically arranged and the boss portion is concentrically arranged integrally with the rotation shaft. The blades of each of the multi-blade impellers are annularly extends forward on each of the partition plates at plural kinds of mounting pitches in a circumferential direction of the partition plate.

The multi-blade impellers adjacent to each other in the axial direction are connected while being displaced by a predetermined angle around an axis thereof.

The blades are formed so as to linearly extend in longitudinal directions thereof each with an inclination by a predetermined angle in a direction of rotation thereof. Each of the blades has a thickness in a cross section perpendicular to the rotation shaft, the thickness being reduced in a direction from the base end of the blade to the leading end thereof.

The another one side surface of each of the partition plates is formed with recessed portions to which the leading ends of the blades of the adjacent multi-blade impeller are fitted.

The base ends of the blades are molded integrally with the one side surface of each of the partition plates.

In another aspect of the present invention, there is provided a method of manufacturing a transverse fan comprising the steps of:

preparing a pair of end plates each having an annular shape, a plurality of blades and a plurality of partition plates each having an annular shape;

disposing a plurality of blades annularly between between the end plates each with an inclination at a predetermined angle;

disposing a plurality of the partition plates at intermediate portions of the blades in a manner that each of the partition plates having one side surface to which base ends of the blades are integrally secured so as to extend forward to form a multi-blade impeller;

stacking a plurality of said multi-blade impeller axially so that each of said partition plates has another one side surface to which leading ends of the blades of adjacent multi-blade impeller are connected;

connecting the leading ends of the blades of a leading end side multi-blade impeller to one surface of one of the end plates; and securing the base ends of the blades of a base end side multi-blade impeller to one surface of another one of said end plates, the another one of the end plates being provided with a boss portion to which a rotation shaft for rotating the transverse fan is secured, wherein each of the multi-blade impeller is injection molded integrally in a mold and the multi-blade impeller is thereafter withdrawn from the mold while rotating the multi-blade impeller about a rotation axis thereof.

The multi-blade impeller is withdrawn from the mold while being rotated in an inclining direction of the respective blades. The multi-blade impeller is formed of a resin material.

In a further aspect of the present invention, there is provided an apparatus for manufacturing a transverse fan comprising:

an ejector block for supporting a partition plate in such a manner that the partition plate is ejected outwardly from a lower die and having a connection portion detachably connected to a connection portion of the partition plate;

an ejector shaft for supporting the ejector block; and a cam plate for upwardly ejecting the ejector block while rotating the ejector block through the ejector shaft after an upper die of a mold for injection-molding the multi-blade impeller is separated from the lower die.

According to the above respective aspects of the present invention, since a plurality of multi-blade impellers are sequentially stacked in the axial direction and thus the transverse fan is integrally formed so that the transverse fan can easily and cheaply manufactured. Furthermore, the selection of the number of the multi-blade impellers to be stacked will enable the length of the fan axis to be changed easily. Furthermore, the displacement of the multi-blade impellers in the circumferential direction can be also easily made. In addition, the shape of the blade may be arbitrarily set.

Since the plural blades are stood upward, extending axially, on either side of the partition plates, thus being non-parallel with the fan axis, the pressure generated between the transverse fan having the blades and the nose and between the same and the fan casing can be continuously changed. Therefore, the rotation noise level of the transverse fan can be lowered.

Since each of the partition plates and the blades are integrally molded, the accuracy of the angle made between the mounted blades and the partition plates can stably be improved, thus reducing the scattering in the blowing performance. Furthermore, since the necessity of caulking each blade to the partition plate can be eliminated, the twist angle of the blade can be made larger. Since no gap for caulking is required for the partition plates, the generation of blowing noise due to the introduction of air flows into the gap can be prevented.

Since the plural blades are attached to the partition plates at a plurality of mounting pitches in the circumferential direction, the peak frequency of rotation noise, which has been reduced due to the inclined shape of the plural blades, can be dispersed. Therefore, unpleasant noise level can be lowered and the produced sound quality can be improved.

Since the multi-blade impellers adjacent in the axial direction are displaced by a predetermined angle around the axis, the phase difference can to cause sound pressure waves generated between adjacent blades disposed on the two sides of the partition plate to cancel with each other. As a result, the rotation noise, which has been reduced due to the inclined shape of the blades, can be further reduced.

Since the formed blades extend linearly in their longitudinal directions while being inclined at a predetermined angle in the direction of the rotation, the mold for forming the multi-blade impellers can easily be prepared. Furthermore, the tensile and compression strengths of the blades in their longitudinal direction can be improved. Therefore, the friction generated when the multi-blade impeller is ejected from the mold can be prevented and, therefore, the life of the mold can be lengthened.

Furthermore, the strength of the manufactured multi-blade impeller can be improved and the reliability can be improved. Therefore, the thickness of the blade can be reduced, its weight can be reduced and the quantity of air that is blown can be enlarged.

Since the thickness of each blade in the cross section perpendicular to the axis is narrowed from its base toward the leading portion, the frictional force generated when the multi-blade impeller, which has been molded by injection molding, is ejected from the mold can be reduced. Therefore, ejection can be facilitated and the molding ability can be improved.

Since the multi-blade impeller molded by injection molding is ejected from the mold while being rotated in the direction of the inclination of each blade around the rotational shaft, each blade can easily be ejected while being protected from damage even if each blade is inclined with respect to the partition plate by a predetermined angle. Therefore, the molding ability can be improved and the life of the mold can be lengthened.

The nature and further features of the present invention will be made more clear from the following descriptions made in conjunction with the accompanying drawings.

DESCRIPTION OF THE PREFERRED EMBODIMENTS

Figure 1:
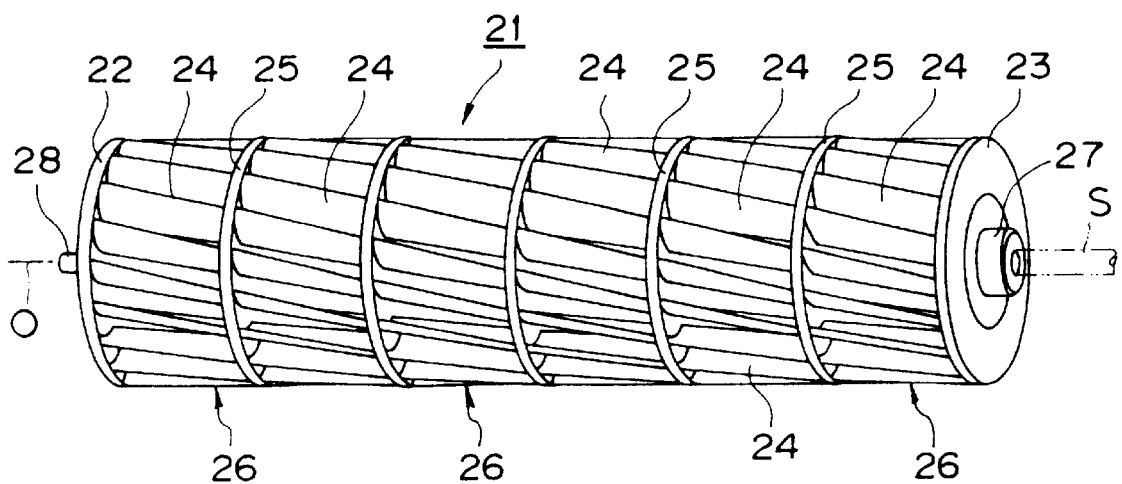
FIG. 1 is a perspective view illustrating an embodiment of a transverse fan according to the present invention.

Preferred embodiments of the present invention will be described hereunder with reference to FIGS. 1 to 16, in which the same reference numerals are added to the same or corresponding portions.

Figure 2:
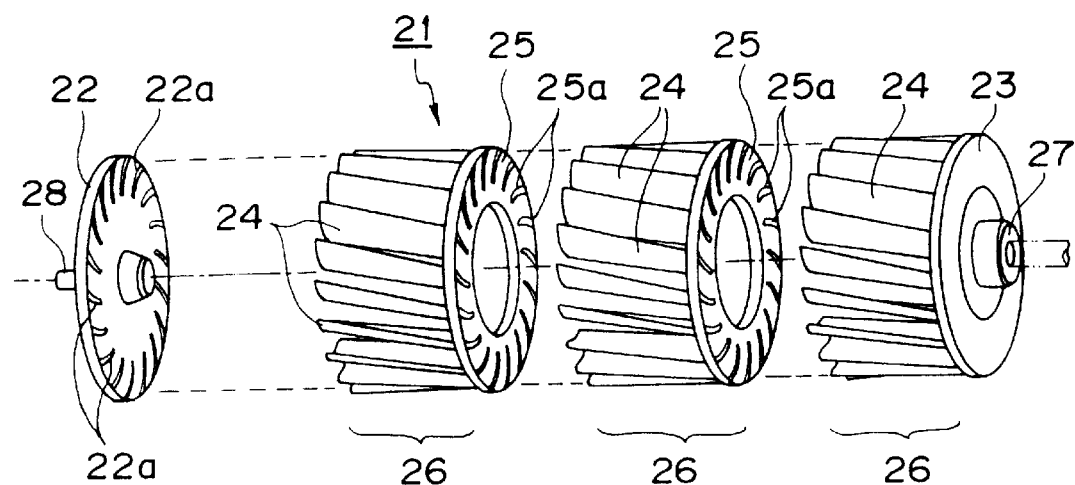
FIG. 2 is an exploded perspective view illustrating the embodiment shown in FIG. 1.
Figure 3A:
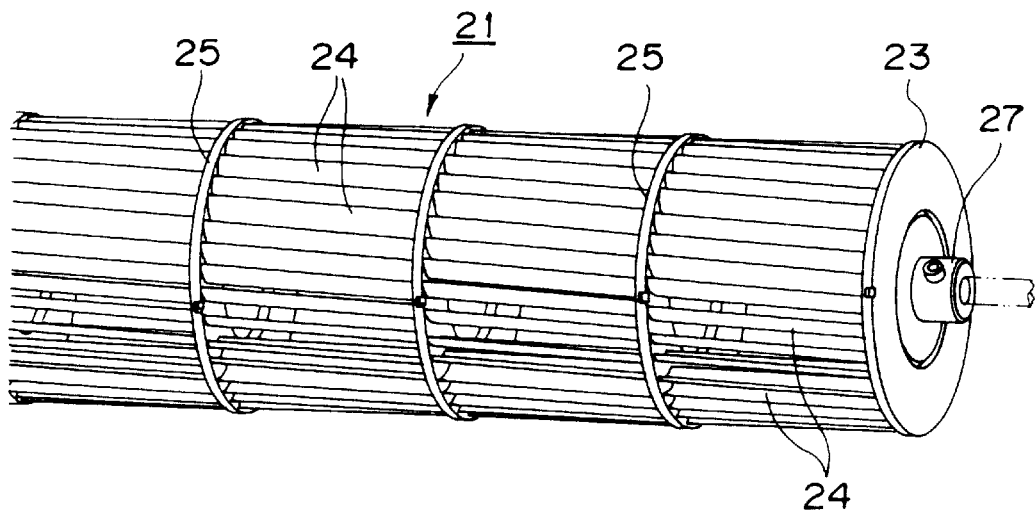
FIGS. 3A and 3B are detailed enlarged views of FIG. 1.
Figure 3B:
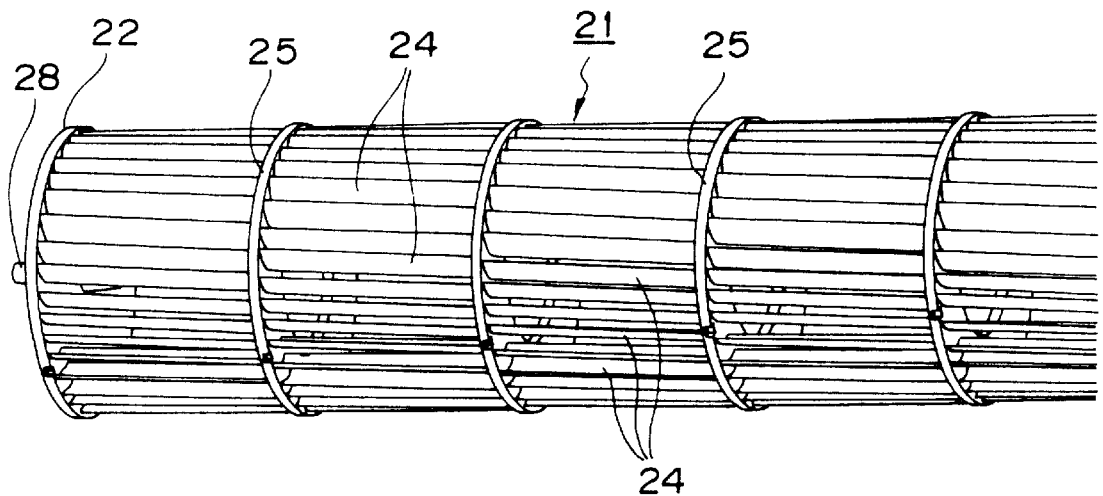

FIG. 1 is a perspective view illustrating the overall structure of one embodiment of the present invention, FIG. 2 is an exploded perspective view of FIG. 1, and FIGS. 3A and 3B are detailed perspective views of FIG. 1.

Figure 17:
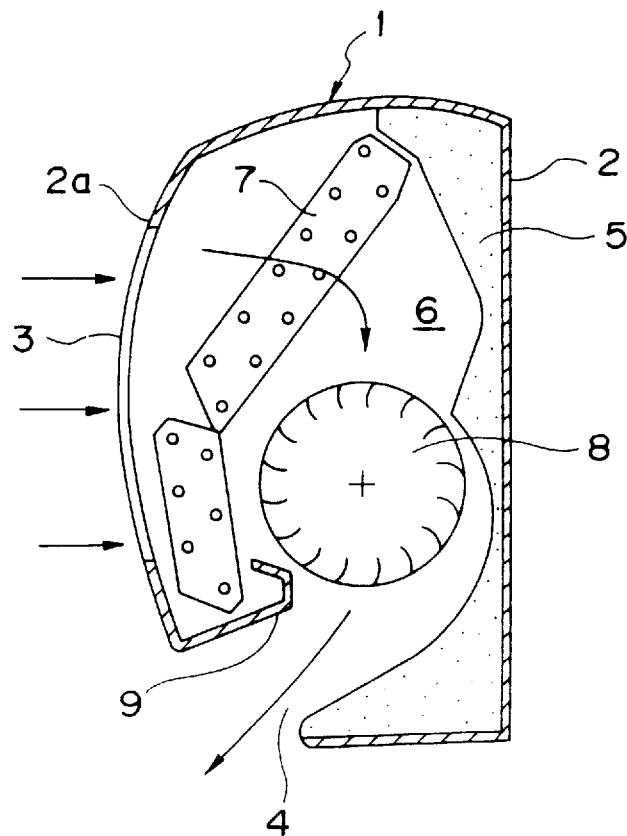
FIG. 17 is a vertical cross sectional view illustrating an example of a room unit for a conventional air conditioner.
Figure 18:
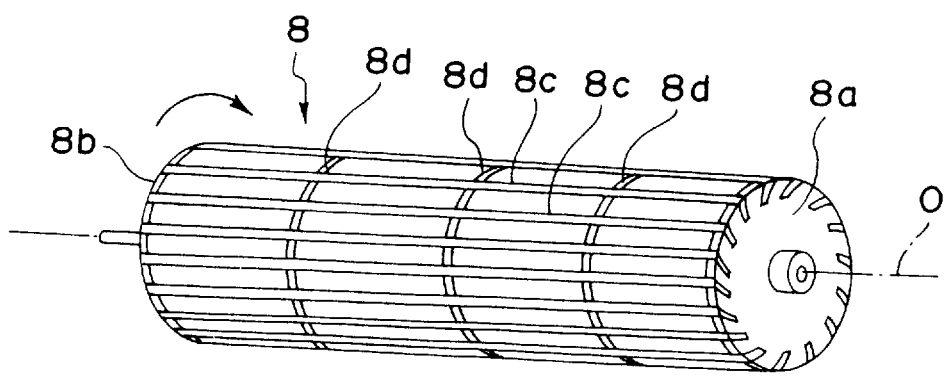
FIG. 18 is a perspective view illustrating a conventional transverse fan used of the air conditioner shown in FIG. 17.

A transverse fan 21 shown in FIGS. 1 to 3 is suitable for incorporating in a room unit 1 (indoor unit) of an air conditioner shown in, for example, FIG. 17. A plurality of blades 24 each having a circular-arc shape horizontal cross section is concentrically and annularly disposed between a pair of right and left end plates 22 and 23 and is horizontally secured thereto while being inclined by a predetermined angle. Annular (ring-shape) partition plates 25 are disposed at intermediate positions in the axial direction of each of the blades 24 at predetermined pitches in the axial direction. When the blades 24 are rotated around a fan axis O, the blades 24 supply air in the axial direction.

The transverse fan 21, as shown in FIG. 2, comprises a plurality of multi-blade impellers 26 molded integrally and sequentially and concentrically secured in the axial direction thereof. The end plate 23 of the multi-blade impellers 26 disposed at the right end portion of FIG. 2 has a boss portion 27 concentrically and/or integrally formed on the outer surface of the annular partition plates 25 for detachably securing a rotational shaft S of a motor or the like with a screw or the like means.

On the other hand, an end plate 22 disposed at the left end of FIG. 2 causes the leading portion of each of the blades 24 of the multi-blade impeller 26 disposed to the right portion in FIG. 2 to be inserted and secured within each receiving groove 22a. The end plate 22 has, at the central portion of the outer surface thereof, a projecting shaft 28 formed integrally or disposed integrally.

Figure 4:
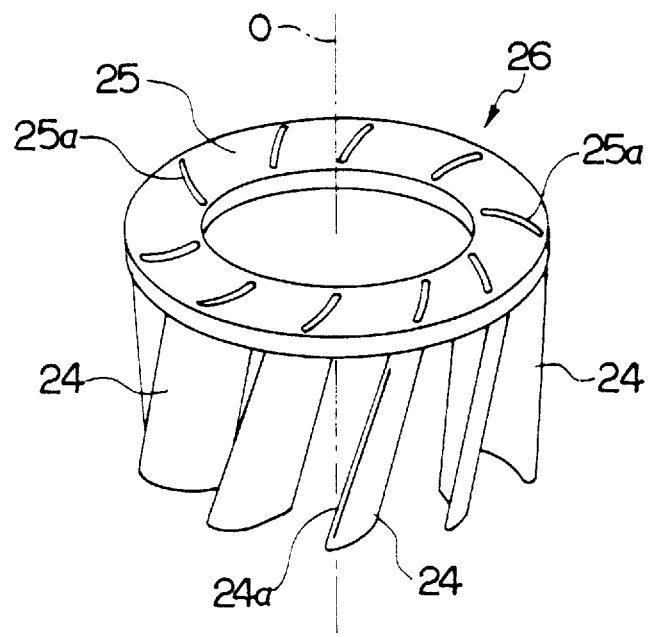
FIG. 4 is a perspective view illustrating an example of the multi-blade impeller shown in FIG. 2.

As shown in FIGS. 2 and 4, each of the multi-blade impellers 26 has, on either side of the annular partition plate 25, circular-arc receiving recesses 25a for receiving and securing the leading end portions of the respective blades 24 of adjacent multi-blade impellers 26. On the other side of the partition plates 25, the plural blades 24 are, through injection molding process or the like process, integrally molded to stand upward at predetermined mounting pitches in the circumferential direction.

Figure 5:
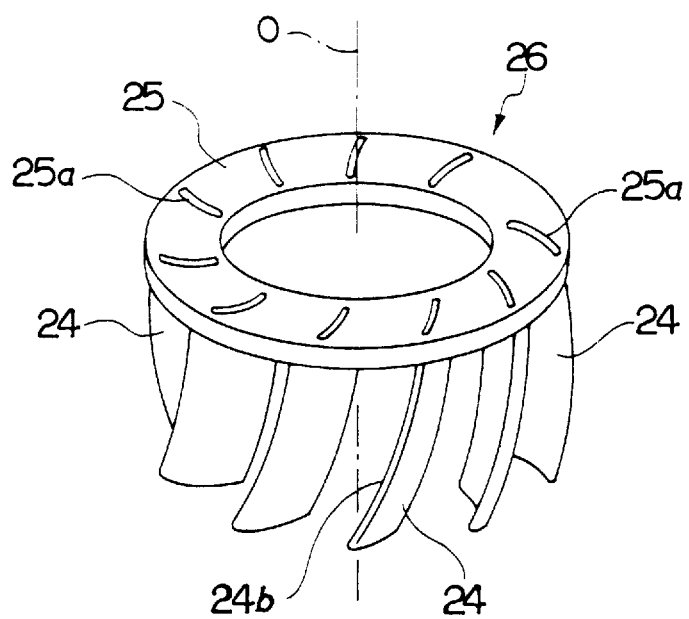
FIG. 5 is a perspective view illustrating another example of the multi-blade impeller shown in FIG. 2.

Each blade 24 is integrally molded with the partition plate 25 in such a manner that its horizontal cross sectional shape is formed into a circular arc inclined forward with respect to the direction of rotation and its front end 24a in the direction of the rotation is inclined linearly by a predetermined angle with respect to the fan axis O. Further, each blade 24 may be integrally molded in such a manner that its front end 24b in the direction of the rotation is inclined in the form of a curve, as shown in FIG. 5.

Figure 6:
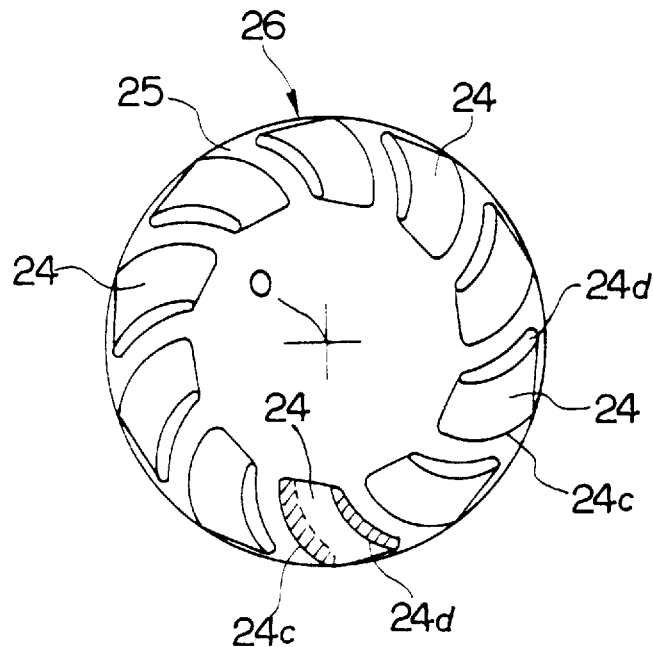
FIG. 6 is a bottom view of FIG. 4.
Figure 7:
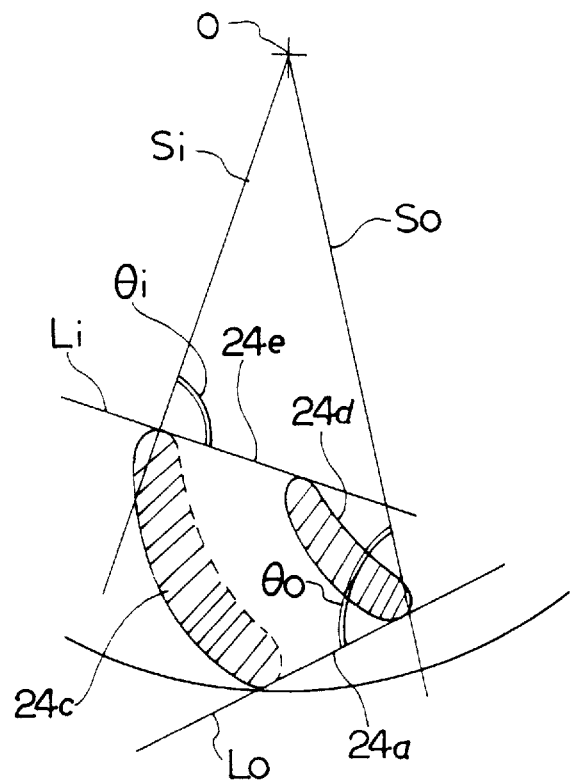
FIG. 7 is an enlarged view illustrating an essential portion of FIG. 6.

As shown in FIG. 6 which is a bottom view and FIG. 7 which is a partially-enlarged view of FIG. 6, each blade 24 is formed into a tapered shape narrowed toward the leading portion thereof such that the thickness of the horizontal cross section is gradually reduced in a direction from a base portion 24c adjacent to the partition plate 25 toward a blade leading portion 24d, and angle θo made between tangent line Lo, which is in contact with an outline of the front end 24a connecting the front ends (external ends) of the blade base portion 24c and the blade leading portion 24d to each other and a line So perpendicular from the front end of the blade leading portion 24d to the fan axis O is 90 degrees or larger ($\theta o \geqq 90°$), and as well as angle θi made between tangent line Li, which is in contact with the outline of a rear end 24e connecting the rear ends (internal ends) of the blade base portion 24c and the blade leading portion 24d to each other, and a line Si perpendicular from the rear end of the blade base portion 24c to the fan axis O is 90 degrees or larger ($\theta i \geqq 90°$).

Figure 8:
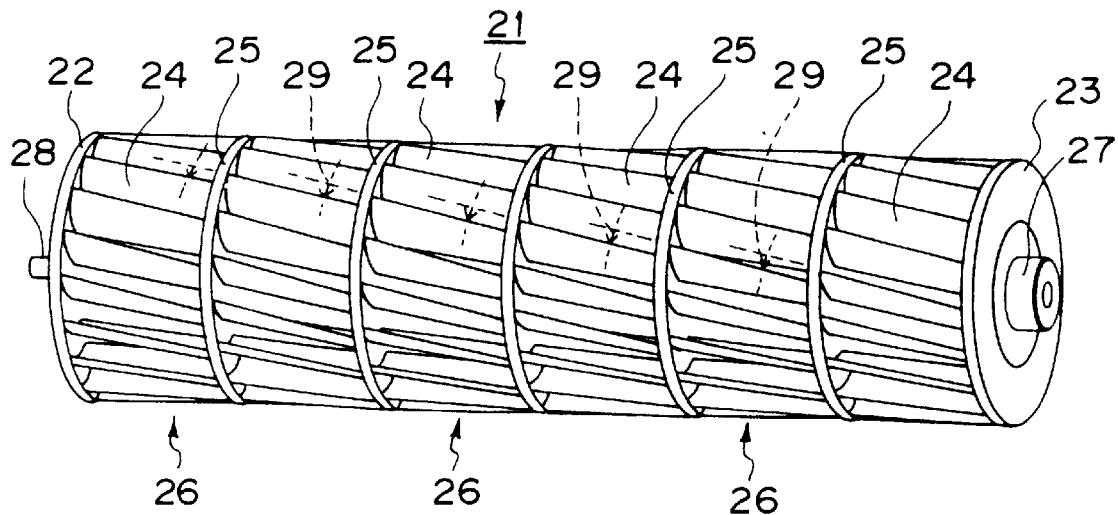
FIG. 8 is a perspective view of the transverse fan of FIG. 1 having a displacing angle.
Figure 9:
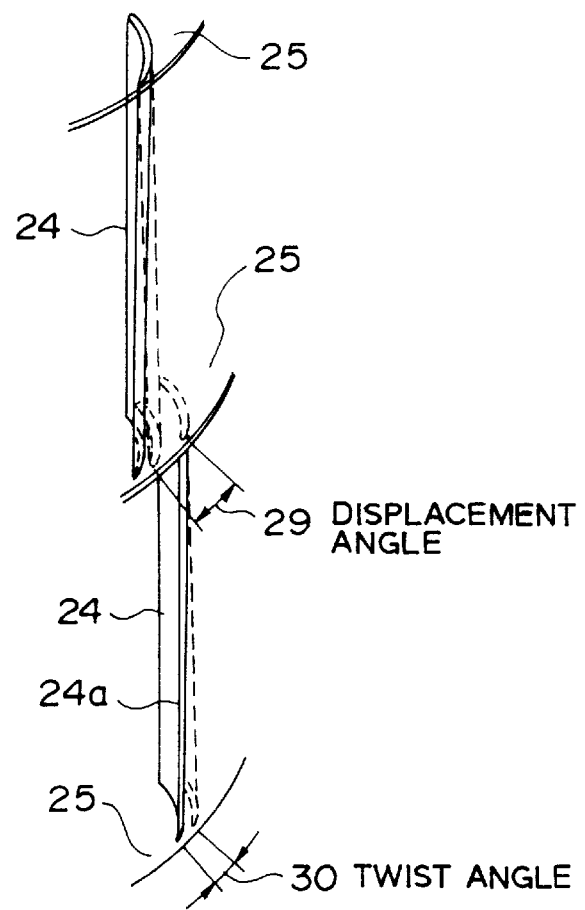
FIG. 9 is an enlarged perspective view illustrating an essential portion of the displacing angle and a twist angle shown in FIG. 8.

The transverse fan 21, as shown in FIGS. 8 and 9, comprises each of the multi-blade impellers 26 disposed adjacently in the axial direction such that the multi-blade impellers 26 are displaced at a predetermined displacing angle 29 in a direction of, for example, the rotation thereof and they are sequentially and concentrically connected to one another.

In the structure described above, each blade 24 is formed on the partition plate 25 such that the leading portion of the front end 24a thereof is inclined by a twist angle 30 in the direction of the rotation from a perpendicular line indicated by a dashed line shown in FIG. 9, the twist angle 30 being made smaller than the aforementioned displacing angle 29.

Figure 10:
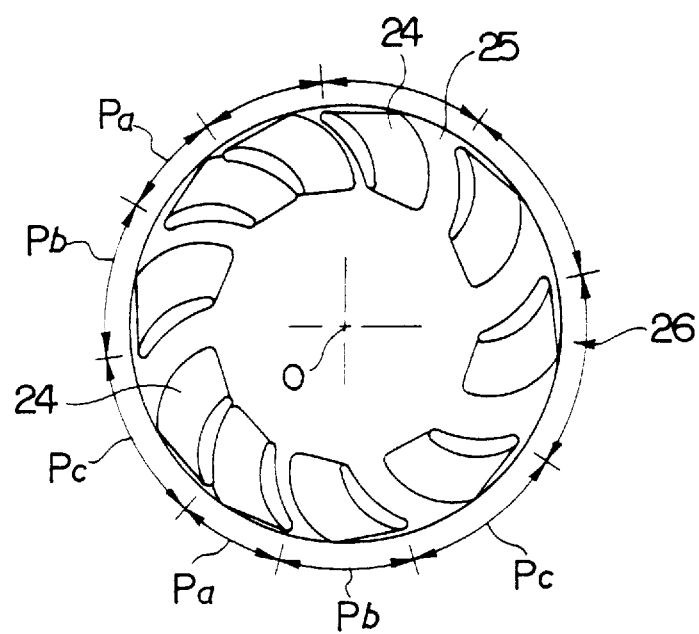
FIG. 10 is a bottom view illustrating the mounting pitches of the attached blades of the multi-blade impeller shown in FIG. 6.
Figure 11:
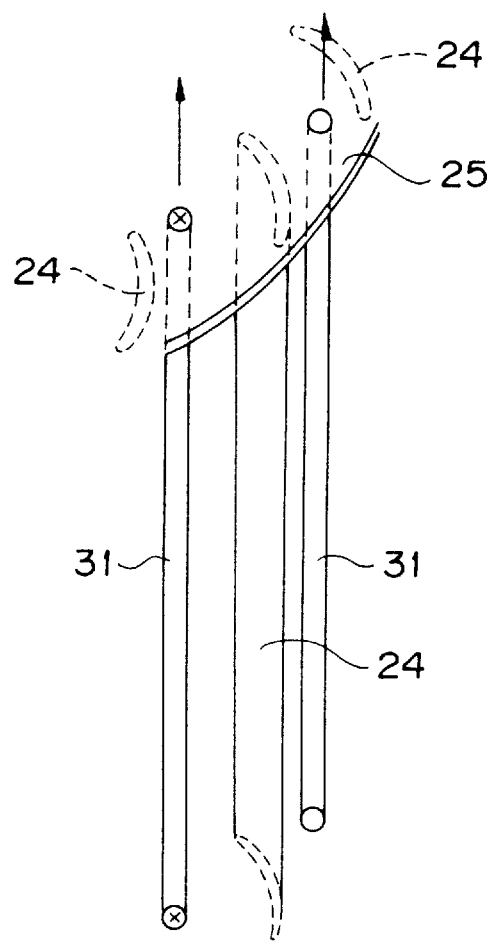
FIG. 11 is an enlarged perspective view which illustrating an essential portion for explaining of a method of ejecting the integrally-molded multi-blade impeller shown in FIG. 2 by a conventional parallel knock pins.

As shown in FIG. 10, each of the multi-blade impellers 26 has an arrangement that the blades 24 on the partition plates 25 are attached at, for example, three or more mounting pitches Pa, Pb and Pc in the circumferential direction thereof.

Then, a method and an apparatus for integrally molding the multi-blade impellers 26 of the structure described above by, for example, injection molding, and then ejecting the same from a mold (a forming mold) will be described hereunder.

Hitherto, in a case where the injection-molded product is ejected from a lower die, which has been separated from an upper die of the mold, it might be feasible to employ a method comprising the step of abutting a plurality of parallel knock pins 31 against the lower surface of the partition plate 25 of the multi-blade impeller 26 to raise the lower surface. Such method, however, cannot easily eject the product from the mold because each blade 24 is inclined with respect to the partition plate at a predetermined angle. If the same is forcibly ejected, the blade 24 or other member will be broken.

Accordingly, the inventors of the present invention have proposed a method having the step of ejecting the multi-blade impeller 26 while rotating the same in the direction of the inclination of each blade 24 and found an ejector apparatus therefor.

Figure 12:
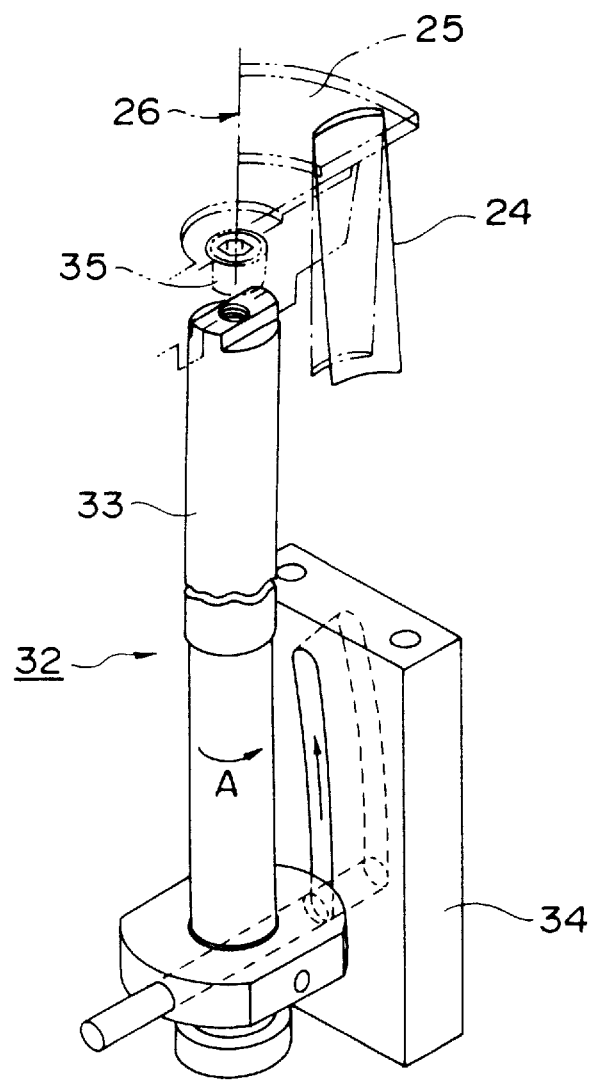
FIG. 12 is a perspective view illustrating an ejector apparatus for ejecting the multi-blade impeller shown in FIG. 2 from a mold.

FIG. 12 is a perspective view illustrating an essential portion of an ejector apparatus 32 which comprises an ejector shaft 33, which is rotated around the axis, having a skew cam plate 34 that can be linked by a cam structure, the skew cam plate 34 being vertically moved by rotating the ejector shaft 33. The ejector shaft 33 has, at the top end thereof, an ejector block 35 connected thereto.

Figure 13:
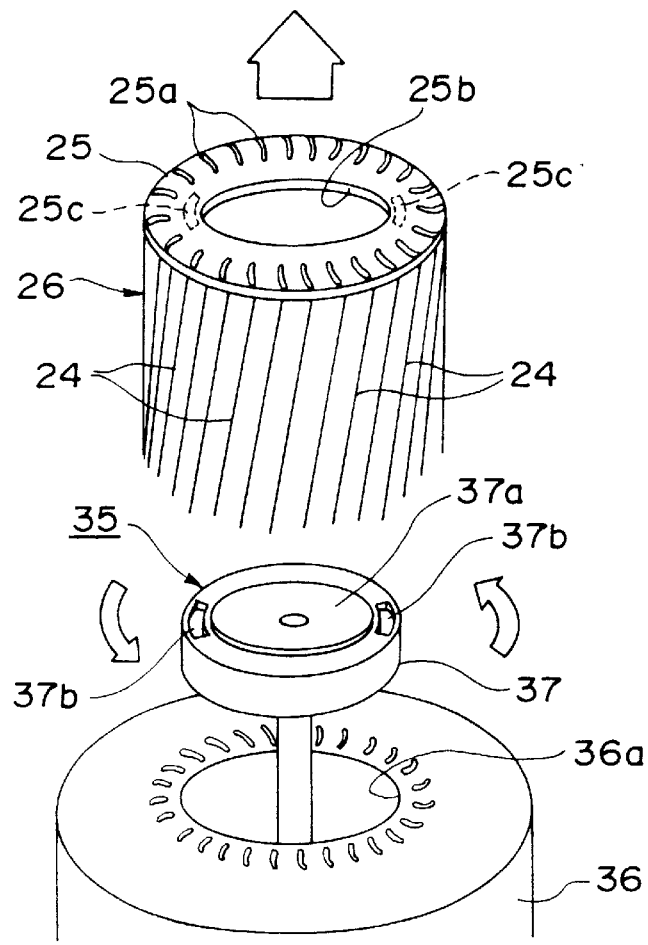
FIG. 13 is a perspective view illustrating a state where the multi-blade impeller shown in FIG. 2 is ejected from a lower die by an ejector block shown in FIG. 12.

The ejector block 35, also as shown in FIG. 13, upwardly projects from a central hole 36a of a lower die 36 when the upper die of, for example, a mold (not shown) that can be vertically separated from each other, is separated from the lower die 36 so as to upwardly eject the multi-blade impeller 26 from the lower die 36 while rotating the same around the axis. The ejector block 35 has a disc-like mount 37.

The mount 37 forms a portion of the partition plate 25 for the multi-blade impeller 26 in association with the lower die 36 when the multi-blade impellers 26 are molded, the mount 37 having a circular projection 37a that forms a central hole 25b of the partition plate 25.

Figure 14:
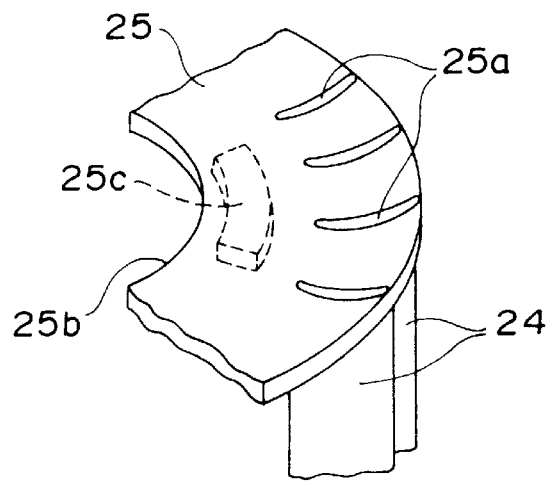
FIG. 14 is a partially enlarged perspective view illustrating the multi-blade impeller shown in FIG. 13.
Figure 15:
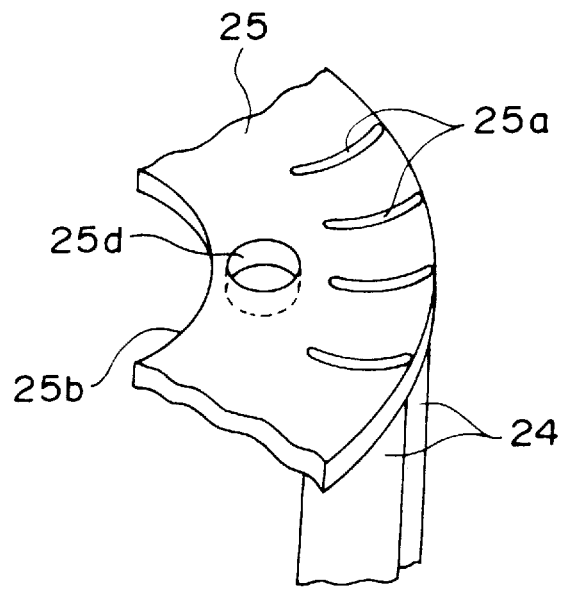
FIG. 15 is a partially enlarged perspective view illustrating a modification of the multi-blade impeller shown in FIG. 13.
Figure 16:
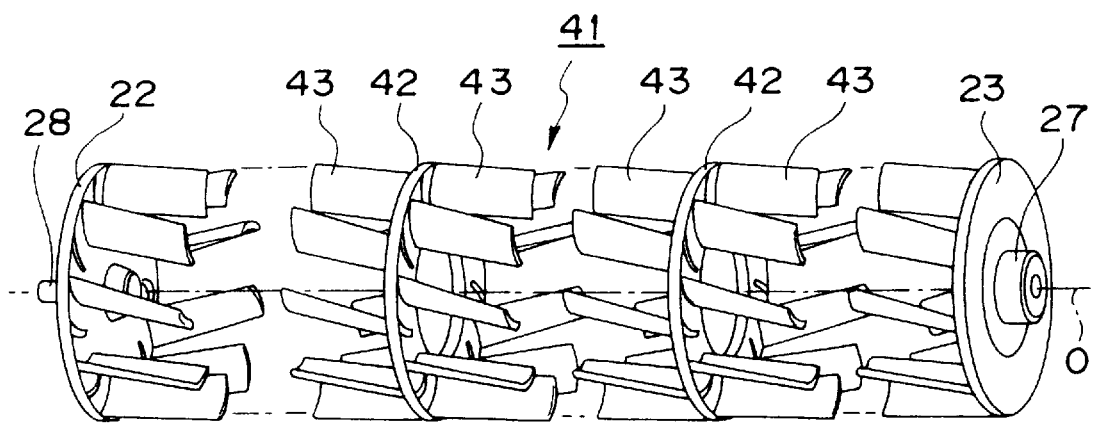
FIG. 16 is a partially-cut exploded perspective view illustrating another embodiment of the present invention.

The projection 37a has, on the top outer surface thereof, receiving recesses 37b formed therein as shown in FIG. 14 to cause projections 25c in the form of a rectangle to be detachably received into the inner surface (the lower surface) of the partition plate 25. When the mount 37 is rotated to raise the multi-blade impeller 26 while being rotated, the multi-blade impeller 26 is able to surely follow up the mount 37. Further, each projection 25c of the partition plate 25 may be a formed as a circular hole 25d, as shown in FIG. 15, and in such case, a projection which detachably received by each circular hole 25d must be formed on the ejector block 36 so as to project from the same.

Therefore, when the multi-blade impeller 26 is manufactured, resin material is injected into a space created by the upper die, the lower die 36 of a mold, not shown, and the mount 37 so that the multi-blade impeller 26 is molded.

Then, the upper die is separated from the lower die, and the ejector shaft 33 is moved so that the multi-blade impeller 26 is ejected from the lower die. At this time, the skew cam plate 34 rotates the ejector shaft 33 in a direction designated by an arrow A shown in FIG. 12. As a result, the ejector block 35 and the mount 37 are also rotated, causing the partition plate 25 of the molded multi-blade impeller 26 to be rotated. Hence, the multi-blade impeller 26 is ejected from the lower die 36 while being rotated.

Figure 19A:
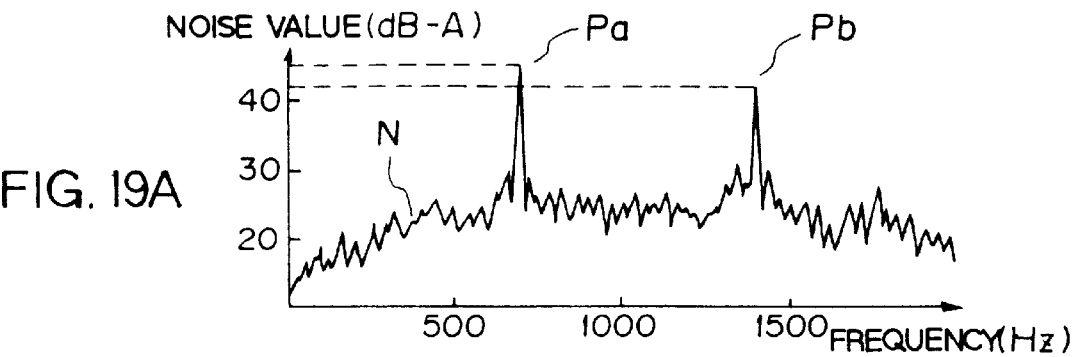
FIG. 19A is a graph showing distribution of rotation noises of the conventional transverse fan shown in FIG. 18, and FIGS. 19B to 19E are graphs showing distribution of rotation noises resulting in each embodiment of the present invention shown in FIG. 1.

Then, an effect of reducing nose obtainable from this embodiment will now be described with reference to FIGS. 19B to 19E, which show the results obtained under the same condition as that of the test from which the test data shown in FIG. 19A has been obtained, the test data showing the noise distribution realized by the conventional example.

That is, the dimensions of the transverse fan, the number of the blades 24 and the rotational speed per unit time period are the same as those of the test of the conventional transverse fan.

Figure 19B:
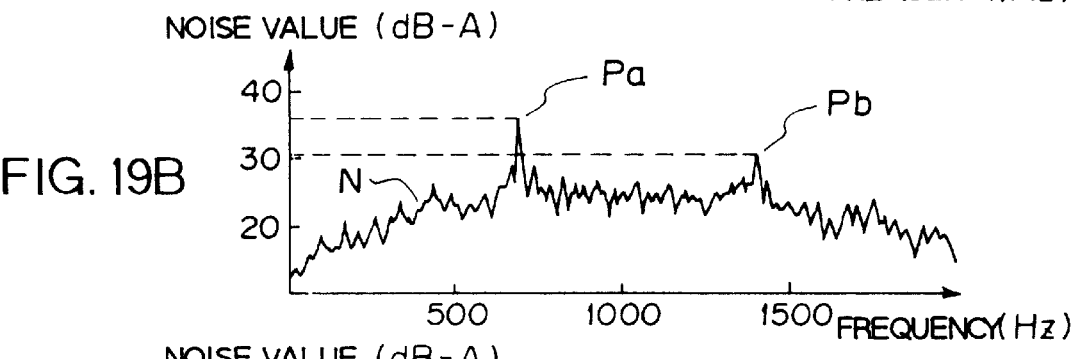

As shown in FIG. 1, since this embodiment comprises each blade 24 that is inclined and thus made non-parallel with respect to the fan axis O, the pressure generated in the gap between the transverse fan 21 and the nose 9 shown in FIG. 17 and that between the transverse fan 21 and the fan casing 5 are continuously changed. Therefore, even if the displacing angle 29 is not provided and as well as the blades 24 are disposed at the same mounting pitches in the circumferential direction, both rotation noise peak value Pa and the harmonic sound peak value Pb can be reduced as shown in FIG. 19B.

Figure 19C:
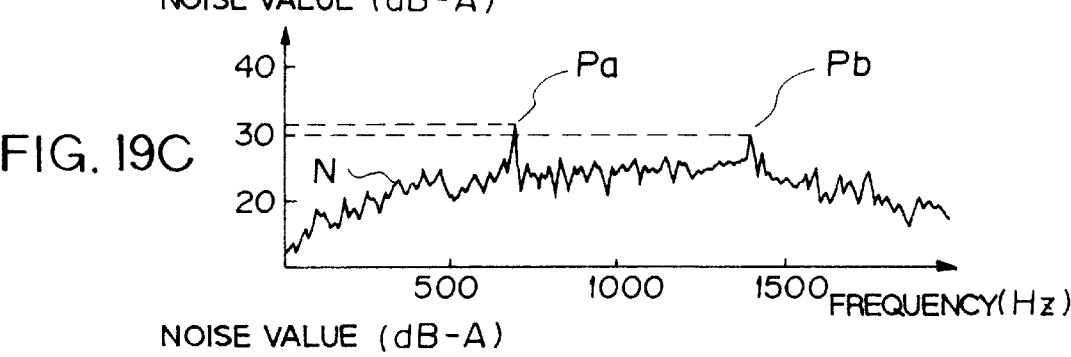

In a case where the blade 24 is inclined with respect to the fan axis O and as well as the displacing angle 29 is provided, the sound pressure wave, which is generated between adjacent blades 24 disposed on the two sides of the partition plate 25, is enabled to have a phase difference so as to be canceled each other due to the displacing angle 29. Therefore, the overall rotation noise, which has been reduced thanks to the inclined shape of the blade 24, can be further reduced as shown in FIG. 19C.

Figure 19D:
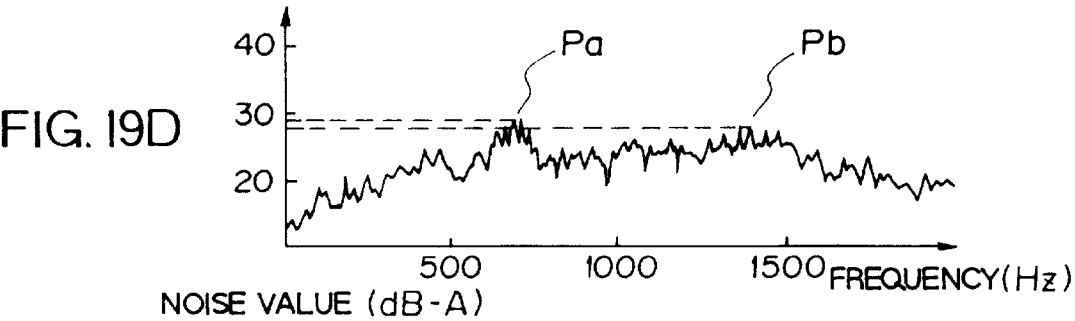
Figure 19E:
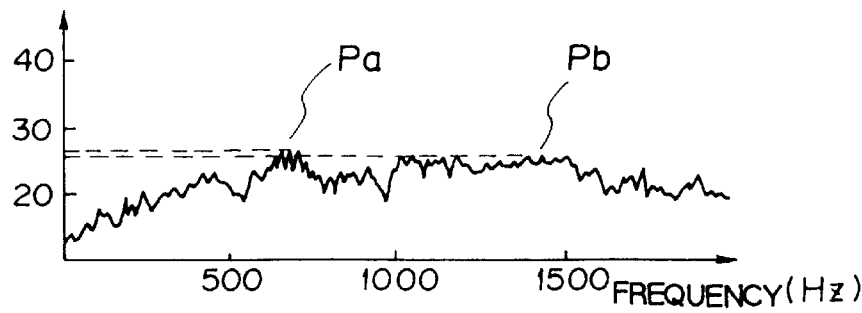

Further, the circumferential-directional mounting pitches of the attached plural blades 24 are set at plural kinds of pitches Pa to Pc so that the peak frequency component of the rotation noise N, which has been reduced due to the inclined shape of each blade 24, can be dispersed, as shown in FIG. 19D. Therefore, unpleasant noise can be reduced and the produced sound quality can be improved.

In a case where the circumferential-directional mounting pitches of the attached plural blades 24 are set at plural kinds of pitches Pa to Pc and as well as the displacing angle 29 is provided, the rotation noise N, which has been reduced due to the inclined shape of each blade 24, can be further reduced. Furthermore, the frequency component of the residual pitch noise of the blade can be dispersed. Therefore, unpleasant noise can be reduced and the produced sound quality can be improved.

Since this embodiment comprises the plural multi-blade impellers 26, each of which is formed by integrally molding the partition plate 25 and each blade 24, which are connected and secured in the axial direction, adequate adjustment of the number of the impellers enables the overall length of the transverse fan 21 to easily be changed. Furthermore, adequate selection of the displacing angle 29 as well as enables the shape of the blade 24 to be changed easily. As a result, the manufacturing cost can be reduced.

Since the multi-blade impeller 26 is formed by integrally molding the blades 24 and the partition plate 25, the following effects will be obtainable:

(1) Since the blade 24 is not required to be twisted in the post-process as has been required for the conventional example, no residual stress is generated and the strength of the blade 24 and the partition plate 25 can be improved. Furthermore, the accuracy of the dimensions of the parts, such as the mounting angle between the blade 24 and the partition plate 25, can be stabilized and improved. Therefore, scattering in the blowing performance can be prevented.

Figure 20:
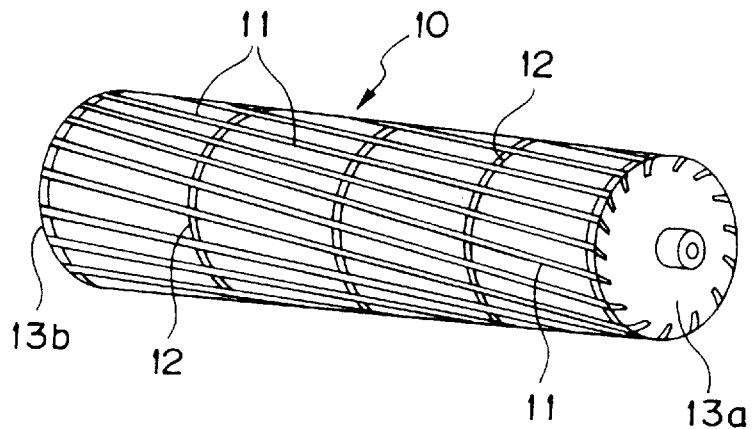
FIG. 20 is a perspective view which illustrating another conventional transverse fan.
Figure 21:
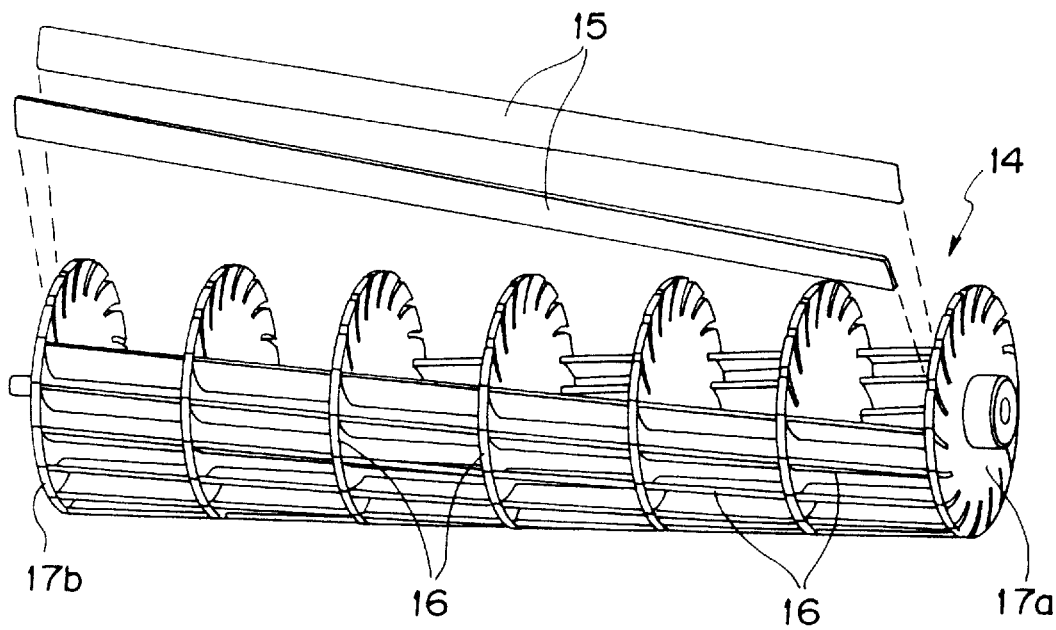
FIG. 21 is an exploded perspective view illustrating the transverse fan shown in FIG. 20.

(2) The twist angle 30 of the blade 24 can be enlarged as compared with that realized by the conventional means, thus resulting in a significant effect of eliminating noise being obtained. The conventional transverse fan 10 having the caulked structure as shown in FIG. 20 involves deterioration in the caulking strength if the twist angle is made large as described above. If intended distortion in the blade 11 is intended to be prevented, a flat plate must be cut into a circular arc shape, wasting of the material.

(3) No abnormal sound, such as blowing noise, that has been generated adjacent to the partition plate 25, is produced. That is, the transverse fan 21 inevitably encounters generation of an axial air flow on the surfaces of the blades 24, and therefore, air flow violently collides with the partition plates 25. Therefore, the conventional caulking method has usually comprises a step of creating a gap except the caulking point to improve the working efficiency. However, the gap introduces axial-directional air flows, thus resulting in blowing noise being generated.

However, the embodiment of the present invention has no through gap in the partition plates 25. As a result, abnormal noise, such as blowing noise, caused from the gap can be substantially prevented.

Since the multi-blade impeller 26 is ejected from the lower die 36 while rotating the same around the axis after the injection molding process has been completed, a frictional force generated at the time of ejecting the multi-blade impeller 26 from the mold can be reduced. Therefore, an ejection process can easily be performed and the molding ability can be improved. Since each blade 24 has a shape narrowed toward the leading portion thereof, the ejection from the mold can further be facilitated.

Since the angles θo made by the tangent lines Lo and Li of the front and rear ends 24a and 24b of each blade 24 and perpendicular lines So and Si of the fan axis O are made 90 degrees or larger, the front and rear ends 24a and 24e do not come in contact with the mold when the multi-blade impeller 26 is ejected from the mold while being rotated. Thus, the stress of the multi-blade impeller 26 can be reduced, the strength can be improved, the wear of the mold can be prevented and the life of the mold can be lengthened.

Although the described embodiment has the arrangement in which the blades 24 are integrally stood upward on either side of the partition plates 25, the present invention is not limited to this embodiment. For example, a transverse fan 41 shown in FIG. 16 may be employed, which comprises a plurality of blades 43 stood upward on the two sides of the annular partition plates 42.

Furthermore, it is to be noted that the present invention is not limited to the described preferred embodiments and many other changes or modifications may be made without departing from the scopes of the appended claims.

What is claimed is:

1. A transverse fan comprising:
   a pair of annularly shaped end plates;
   a plurality of blades, each with a first end and a second end opposite the first end, annularly disposed between said end plates, said blades linearly extending longitudinally, and each of said blades having an inclination of a predetermined angle relative to a direction of rotation thereof; and
   a plurality of annularly shaped partition plates disposed between said end plates, each of said partition plates having a first side to which the first ends of said blades are integrally secured and extend forward with an inclination at a predetermined angle to form a plurality of axially stacked multi-blade impellers,
   wherein each of said partition plates has a second side to which the second ends of the blades extending from the first side of the adjacent partition plate are connected, and
   wherein one of said end plates has a side to which the second ends of the blades extending from the first side of the partition plate adjacent to the one end plate are connected and the other of said end plates has a side to which the first ends of the blades are secured and the second ends of the blades extending from said other end plate are connected to the second side of the partition plate adjacent to said other end plate, said other end plate being provided with a boss portion adapted to be secured to a rotation shaft for rotating the transverse fan.

2. The transverse fan according to claim 1, wherein said blades are concentrically arranged around said partition plates and said boss portion is adapted to be concentrically arranged integrally with said rotation shaft.

3. The transverse fan according to claim 1, wherein said blades of each of said multi-blade impellers annularly extend forward on the respective partition plates at different mounting pitches in a circumferential direction of the respective partition plates.

4. The transverse fan according to claim 1, wherein the multi-blade impellers adjacent to each other in the axial direction are displaced by a predetermined angle around an axis of rotation thereof.

5. The transverse fan according to claim 1, wherein a thickness of each of said blades decreases from the first end of the blade to the second end thereof.

6. The transverse fan according to claim 1, wherein said second side of each of the partition plates is formed with recessed portions to which the second ends of the blades are fitted.

7. The transverse fan according to claim 1, wherein the first ends of said blades are molded integrally with the first side of each of said partition plates.

8. A method of manufacturing a transverse fan comprising the steps of:
   providing a pair of annularly shaped end plates, a plurality of blades each having a first end and a second end opposite the first end, and a plurality of partition plates;
   disposing said blades annularly between said end plates;
   disposing said partition plates between said end plates, with each of said partition plates having a first side to which the first ends of said blades are integrally secured and extend forward with a predetermined inclination to form a plurality of multi-blade impellers;
   stacking said multi-blade impellers axially so that a second side of each of said partition plates connects to the second ends of the blades extending from the first side of the adjacent partition plate are connected;
   connecting the second ends of the blades extending from the first side of the partition plate adjacent to one of said end plates;
   securing the first ends of the blades to the other of said end plates and connecting the second ends of the blades extending from said other end plate to the second side of the partition plate adjacent to said other end plate; and
   providing the other end plate with a boss portion adapted for securing a rotation shaft for rotating the transverse fan,
   wherein each of said multi-blade impellers is injection molded integrally in a mold and is thereafter withdrawn from the mold while rotating the multi-blade impeller about a rotation axis thereof.

9. The method according to claim 8, wherein the multi-blade impeller is withdrawn from the mold while being rotated in an inclining direction of the respective blades.

10. The method according to claim 8, wherein the multi-blade impeller is formed of a resin material.

* * * * *